June 25, 1935.   T. HUTCHINSON   2,006,241
METHOD OF FELLING AND CUTTING FELLED TREES
Filed Jan. 30, 1935
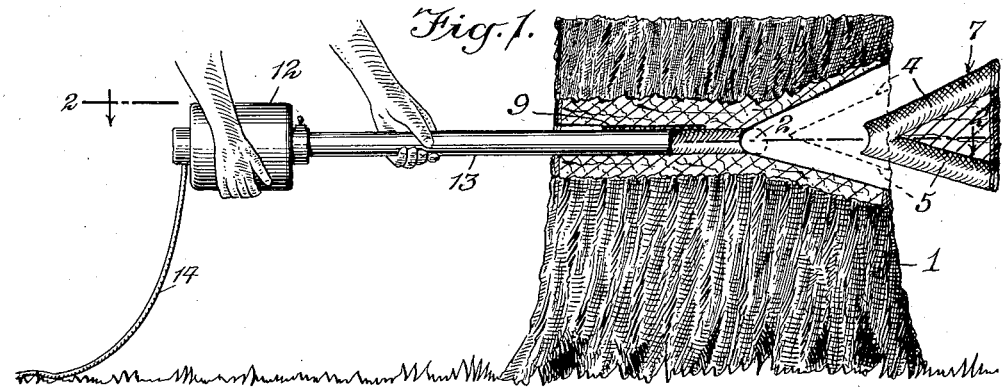
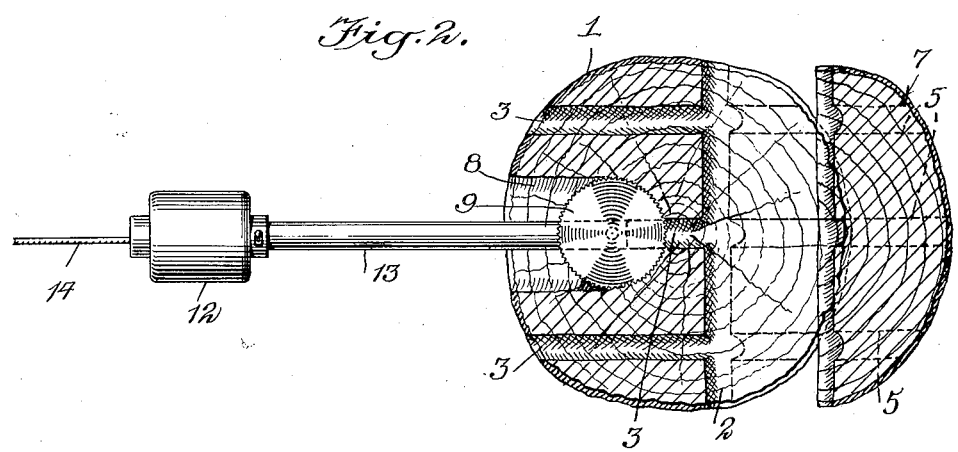
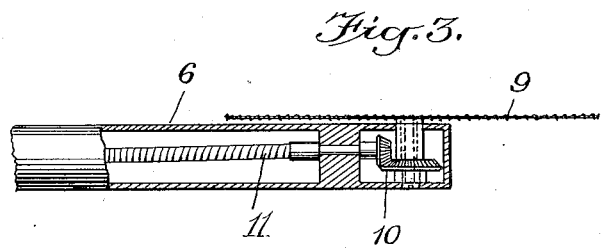
WITNESSES
INVENTOR
Thomas Hutchinson
BY
ATTORNEYS Patented June 25, 1935

2,006,241

UNITED STATES PATENT OFFICE 2,006,241

METHOD OF FELLING AND CUTTING FELLED TREES

Thomas Hutchinson, Newport, Oreg.

Application January 30, 1935, Serial No. 4,156

3 Claims. (Cl. 144—34)

This invention relates to a method of felling trees and particularly trees of some considerable diameter, an object being to provide an improved method whereby tools light in weight may be used for felling trees.

Another object of the invention is to provide a comparatively light weight outfit to be used in felling trees of various diameters.

An additional object of the invention is the utilization of a method of first boring or mechanically cutting holes in the tree to be felled with the holes or bores arranged in certain order, and then cutting the wood away between the respective holes or bores.

In the accompanying drawing—

Figure 1 is a side view of the lower part of a tree, illustrating one of the tools used in felling the tree and also illustrating how the method of applying the various bores is carried out;

Fig. 2 is a sectional view substantially on the line 2—2 of Fig. 1, and

Fig. 3 is a view principally in section, illustrating the sawing tool shown in Figs. 1 and 2, the same being on an enlarged scale.

Referring to the accompanying drawing by numerals, 1 indicates a tree, which may be eight feet or more or less in diameter. Heretofore in felling trees of this size, various means have been used, including ordinary axes, heavy straight saws, and chain saws. When an ax was used, the desired cut was made in one side of the tree for a certain depth, then another cut was made in the other side of the tree. Usually in addition a wedge was applied in the first cut so that the tree would fall in the opposite direction.

According to the present invention a main bore 2 is made in the tree by a suitable auger or other boring instrument, and in addition to this main bore a plurality of straight auxiliary bores 3 are provided. In the accompanying drawing three auxiliary bores have been shown. However, for a tree eight or more feet in diameter there would probably be more bores. The bores 3 extend horizontally to the main bore 2. Similar bores 4 and 5 are provided on the opposite side of the tree to the bores 3. After all the bores have been made, a cutting tool 6 is used to cut away the material between the various bores. Preferably the material is cut away between the various bores 4 and 5 so that the wedge-shaped part 7 of the tree 1 may be removed. This leaves a notch substantially the shape that is usually made in cutting down a tree with an ax. The cutting tool 6 is then applied to the outside of the tree and a cut is made for each bore 3, said cuts extending to the bore 2, or almost thereto, according to the circumstances. After the central cut 8 has been provided, the cutting tool is removed and, if desired, a wedge may be inserted into this cut while the other cuts are being made. Usually the tree falls before all the cuts have been completed and, consequently, the central cut 9 generally falls a little short of the main bore 2, while the remaining cuts are preferably made completely through the part of the tree where the bores 3 are located. If this particular method is used and the tree does not fall, wedges could be inserted into the various cuts on each side of the central cut and then the cutting tool reinserted in the central cut so that the central cut will be caused to extend to the main bore 2. As the tree is weakened on one side by the removal of the wedge-shaped block 7, the provision of the various cuts on the outside of the tree and the wedges used will cause the tree to fall towards the side from which the block 7 was removed.

Various forms of cutting tools may be used, but in carrying out the present method of felling trees, the particular cutting tool shown in the accompanying drawing has been found to be very desirable. This cutting tool consists of a small circular saw 9, driven by a pair of bevel gears 10 actuated by a flexible shaft or cable 11, which is connected to a rotating part of an electric motor 12. A casing 13 surrounds the cable 11 and the gears 10. A suitable electric supply cable 14 is connected to the motor 12, and it will be understood that a suitable switch is provided for turning the current on and off whenever desired. The various bores 3 are of a size to readily receive the casing and, consequently, when a cut is being made, as, for instance, the cut 8 shown in Fig. 2, the casing 13 will slide along the bore 3 and guide the saw 9 as it is forced into the tree. Preferably the bores 3 are spaced a distance slightly less than the diameter of the saw 9, so that when the saw makes two adjacent cuts, said cuts will merge together. In actual use the saw may be six or eight inches in diameter, or even larger if desired. Also, if desired, the casing 13 could extend slightly beyond the saw 9 so that it will enter a short distance into the bore before the saw first strikes the tree. However, it has been found that the arrangement shown in the drawing produces satisfactory results and keeps the weight down to the desired extent.

By the method of felling trees set forth one person may pass through a woods and cut down any tree desired; also having cut down the tree, he may cut it into lengths so that it may readily be hauled to a mill or other desired point. In providing an auger or drill and the cutting tool as shown in the drawing, it is intended that these parts shall not exceed fifty pounds. The question of weight is important in carrying out the method involving the invention as these tools must be carried various distances by one person. Where the motor 12 is an electric motor, the cable 14 must be of a length to reach the desired supply source. In addition, the present method permits the operator to cut a tree near the ground and therefore produce very low stumps and as a result secure the most lumber from a given tree.

The expressions "boring" and "sawing" have been used in this specification, but it will be evident that the invention contemplates the forming of the holes as specified and the cutting away of the wood between the holes by any suitable implement. Therefore, the expression "boring" is intended to cover the mechanical cutting or forming of holes by any implement, and by "sawing" is meant the cutting or severing not only by a saw but by any implement that might be suitable.

I claim:

1. The method of felling and cutting felled trees including the making of mechanically cut holes in a row partly through a tree, making a mechanically cut main hole through the tree at one end of the first-mentoned holes, then making two rows of mechanically cut holes positioned at an angle to the said row of holes so that they will merge into said main hole, the last-mentioned holes being on the opposite side of the tree to the first-mentioned holes, and finally cutting away the material contained between the respective holes.

2. The method of felling trees including boring a plurality of holes from one side of a tree at an angle to the horizontal, boring a second row of holes on the same side of the tree at an opposite angle so that the various borings will merge together at a point intermediate the diameter of the tree, boring a main hole at the juncture of the first-mentioned holes, said main hole extending at a right angle to the first-mentioned holes, then boring a series of horizontal holes on the opposite side of the tree to said main hole, cutting away the wood between the respective holes of the first two mentioned borings, and then cutting away the wood between the last-mentioned borings.

3. The method of felling large diameter trees, consisting in boring a plurality of holes into one side of a tree, said borings outlining a wedge, cutting the wood from between said borings by a circular saw having a guiding casing fitting into the respective bores during the respective cutting operations whereby the saw will follow the direction of the bores and thereby cut a wedge from that side of the tree, boring a plurality of horizontal holes from the outside of the tree to the apex of said wedge, and then using the same saw structure for cutting the material between said last-mentioned holes with the saw cutting the material between the bores, and the casing carrying the saw moving along in the bores, said saw making a cut for each bore with half the cut on each side of the bore.

THOMAS HUTCHINSON.